May 17, 1938.  W. AMES  2,117,267
GAUGE
Filed Feb. 5, 1935  2 Sheets-Sheet 2
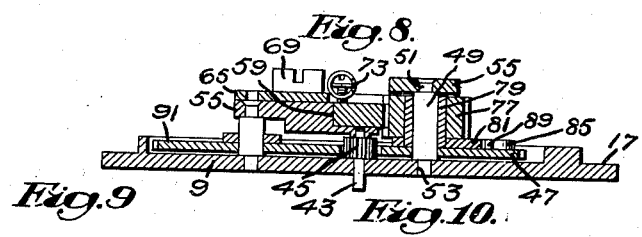
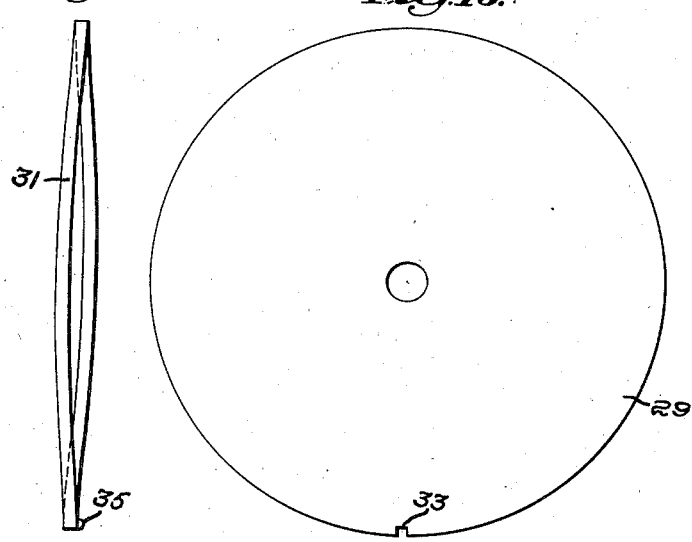
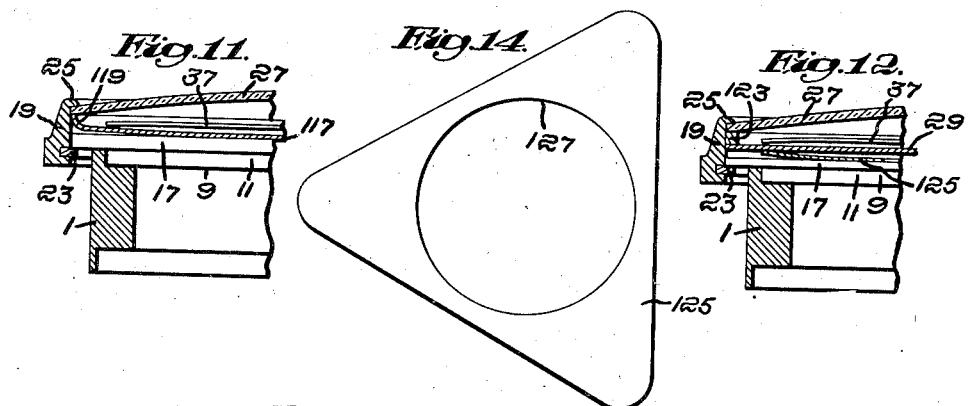
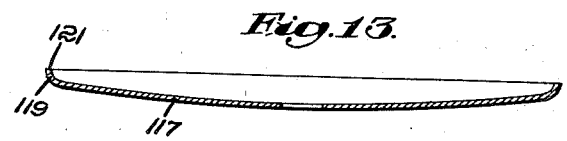
Inventor:
Warren Ames,
by Emery, Booth, Varney & Townsend
Attys Patented May 17, 1938

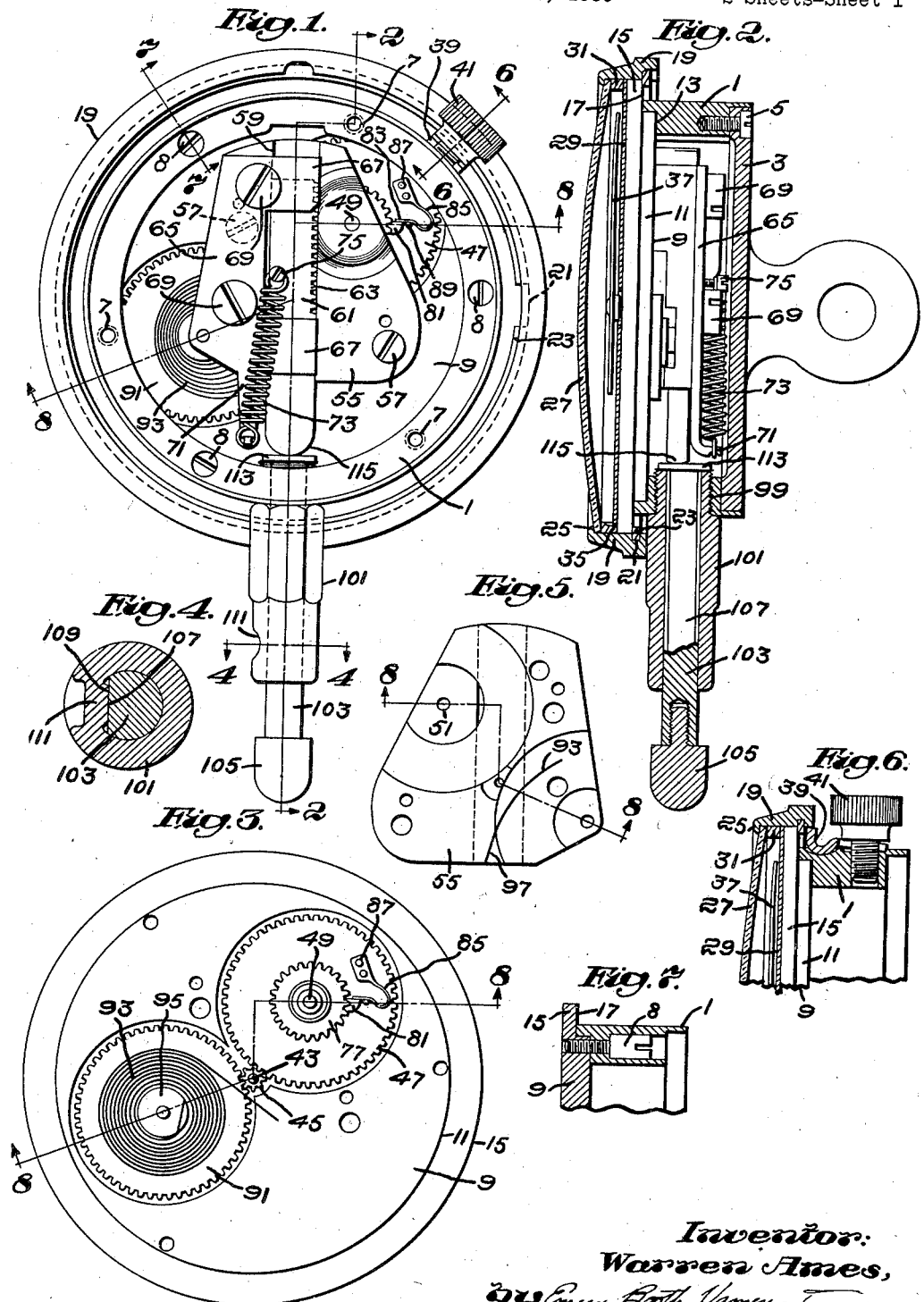

2,117,267

UNITED STATES PATENT OFFICE 2,117,267

GAUGE

Warren Ames, Newton, Mass.

Application February 5, 1935, Serial No. 5,051

10 Claims. (Cl. 33—172)

My invention relates to gauges, and particularly, but not exclusively, to so-called dial micrometer gauges. In respect to micrometer gauges the invention constitutes an improvement in the gauge disclosed by my Patent No. 1,966,424, dated July 17, 1934.

The invention, which has among its objects the provision of a gauge which will stand rough usage, and in which the parts may be assembled and disassembled readily for inspection and repair, will be best understood from the following description when read in the light of the accompanying drawings of several embodiments of the invention, the scope of which latter is more particularly pointed out in the appended claims.

In the drawings:—

Figure 1 is a rear elevation of a gauge, constructed according to the invention, with the back plate removed;

Fig. 2 is a section on the line 2—2 of Fig. 1 with parts shown in elevation and with the back plate in position;

Fig. 3 is a plan of the rear side of the front plate with part of the mechanism carried by said plate removed;

Fig. 4 is a section on the line 4—4 of Fig. 1;

Fig. 5 is a bottom view of the rack and gear supporting bridge or frame member carried by the front plate;

Figs. 6 and 7 are sections on the lines 6—6 and 7—7 respectively of Fig. 1;

Fig. 8 is a section on the line 8—8 of Fig. 1, with parts omitted, the section line 8—8 also appearing in Figs. 3 and 5 for convenience in coordinating the showings of these figures;

Fig. 9 is a side elevation of one form of the crystal spacing and retaining ring;

Fig. 10 is a plan of the dial plate with the graduations omitted;

Fig. 11 is a fragmentary view, corresponding to Fig. 2 with parts omitted, showing a modification of the invention;

Fig. 12 is a fragmentary view, corresponding to Fig. 2 with parts omitted, showing a further modification of the invention;

Fig. 13 is a transverse diametric section of the dial plate employed in the modification shown by Fig. 11; and Fig. 14 is a plan of a spring member employed in the modification according to Fig. 12.

Referring particularly to Figs. 1 to 10, the gauge includes a casing or support having a ring-shaped casing member 1 and a back plate 3 removably secured to this casing member by a plurality of screws 5, the screw holes for the latter being indicated at 7 in Fig. 1.

At the front side of the casing member 1 and secured thereto by screws 8 is a front plate indicated in its entirety by the reference character 9. The front plate is shown as formed with a reduced diameter portion 11 received in an annular recess 13 formed in the front face of the ring member 1. The large diameter portion 15 of the front face overhangs the ring member 1 throughout its circumference to form an annular rearwardly facing shoulder 17.

Rotatably mounted on the periphery of the large diameter portion 15 of the front plate is a bezel ring 19 provided at one end with an internal annular groove 21 in which is removably received a resilient split ring 23. As shown, this ring is rectangular in cross-section and projects radially inwardly from the bezel ring to form a forwardly facing shoulder which abuts against the rearwardly facing shoulder 17 on the front plate, so that when the split ring is positioned in the groove the bezel ring is restrained against axial movement forwardly relative to the front plate while permitted to rotate thereon.

At its forward end the bezel ring is provided with an inwardly extending annular bead 25 the rearward face of which forms an abutment against which the periphery of the crystal 27 rests. Resting on the front plate is a dial plate 29, while between the dial plate and the crystal is a ring 31 which serves to hold the crystal against the bead 25. In this modification of the invention the ring 31 may be axially deformed, as shown in Fig. 9, to make it resilient axially thereof, so that when in position in the assembled device, as shown by Fig. 2, it will exert sufficient pressure axially thereof to urge the bezel ring forwardly relative to the front plate to hold the ring 23 frictionally against the shoulder 17 of the front plate. The frictional engagement of the ring 31 with the crystal causes the ring to rotate with the bezel. As shown, the dial plate 29 is formed with a peripheral notch 33 (Fig. 10) into which enters a lug 35 (Fig. 9) formed on the ring 31 so as to insure that when the bezel ring is rotated the dial plate will rotate with it.

The crystal 27 is preferably a disc of transparent resilient sheet material such as celluloid or the like. The disc before insertion in the bezel ring is preferably flat and has a diameter greater than the internal diameter of the bezel adjacent the bead 25. When inserted in the bezel this disc flexes and assumes the shape indicated in Fig. 2, that is to say, approximately conforms to a spherical surface. This construction permits the crystal to be snapped into and out of the bezel ring, when the latter is removed from the front plate, by mere pressure of the fingers, and entirely avoids the necessity for the use of special tools, ordinarily not possessed by the user of the gauge, for renewing the crystal when it becomes damaged. After the crystal is snapped against the bead 25 the ring 31 may be placed in position in the bezel ring and the latter placed over the large diameter portion 15 of the front plate, after which the retaining ring 23 may be entered into the groove 21 to hold the parts in position.

It will be understood that the dial plate 29 conveniently is calibrated in opposite directions from a zero point, as indicated in my patent above referred to, as is common practice in the art. Cooperating with the dial plate is a rotary indicator hand 37. As will be understood by those skilled in the art, by rotating the bezel ring relative to the front plate and indicator hand 37, the zero mark, or any other convenient graduation mark, may be placed under the stationary indicator hand. If desired, for locking the bezel ring against rotation a suitable clip 39 (Figs. 2 and 6), adapted to engage the inner periphery of the rearward end of the bezel ring, may be provided, this clip conveniently being operated by means of the thumb screw 41.

In the present form of gauge, the indicator hand 37 is mounted on a rotatable post 43 (Figs. 3 and 8) to which is fixed a center pinion 45 meshing with a gear 47 fixed to a spindle 49, the spindle at opposite ends being rotatably supported in bearings 51 and 53 formed in the bridge member 55 and front plate 9 respectively. As shown, this bridge member is carried by the front plate and is secured thereto by screws 57 (Fig. 1).

The bridge member 55, as shown, is formed on its upper side with a slot 59 of rectangular cross-section in which is reciprocally mounted a rack bar 61 of rectangular cross-section having the rack teeth 63. As shown, the rack bar is retained in the slot by a plate 65 having a pair of laterally projecting portions 67 which rest against the upper side of the rack and hold it in the slot. As illustrated, the plate 65 is secured to the frame member 55 by screws 69, and is formed at one of its ends with a projecting portion 71 to which is secured one end of a spring 73, the other end of said spring being attached at 75 to the rack so as to urge the latter downwardly with the gauge in the position shown by Fig. 1.

Meshing with the teeth 63 of the rack is a rack pinion 77 fixedly secured to an internal sleeve 79 rotatably mounted on the spindle 49. Fixedly secured to the other end of the sleeve 79 is a radially projecting arm 81 the outer end of which forms a stop cooperating with a stop 83 carried by the gear wheel 47. The stop 83, as shown, is formed as the end part of a spring member 85, which latter has a base portion 87 rigidly secured to the gear wheel 47. As shown, the gear wheel has an upwardly projecting pin 89 serving as an abutment against which the stop 83 rests to hold the spring 85 under initial tension.

In the present embodiment of the invention, the front plate has rotatably mounted thereon a gear 91 which meshes with the center pinion 45, the gear being urged to rotate by a hair spring 93 in such direction as will rotate the gear wheel 47, through the center pinion 45, to cause the stop 83 to move into contact with the arm 81 operatively carried by the rack pinion 77. As shown, the hair spring is attached at its inner end (Fig. 3) to the hub 95 of the gear 91, and at its inner end (Fig. 5) to the bridge member 55 at 97. The force of the hair spring imparted to the stop 83 when the parts are at rest is less than the force under which the spring 85 holds the stop 83 against the abutment pin 89, so that normally the stop 83 is rigid in relation to the gear wheel 47.

As shown, the casing ring member 1 is provided with a radial screw-threaded perforation 99 into which is removably screw-threaded an elongated guide member 101. In the guide member is reciprocally mounted a contact feeler rod 103 the lower end of which carries the removable contact feeler "point" 105. As shown, the rod has a flattened side 107 slidably contacting with the side 109 of a pressed in portion 111 at the lower end of the guide member 101, this construction preventing rotation of the contact feeler rod relative to the rack bar 61 in the assembled device.

As shown, the contact feeler rod 103 at its inner end has a flattened head 113 the end surface of which is contacted by the end surface of the rack bar 61 due to the latter being urged downwardly into the position shown by Fig. 1 by the spring 73. Preferably the end of the rack bar is rounded in three dimensions, as indicated at 115 (Figs. 1 and 2), so that "point-contact" is had between the rack and the head 113 of the contact feeler rod. By preventing the contact feeler rod from substantial rotation relative to the rack bar 61, and having a point-contact between said bar and rod, inaccuracies in the end surface of the head 113 of the rod are ineffective to affect the reading of the gauge the dial of which, as will be understood by those skilled in the art, commonly is calibrated in thousandths or ten-thousandths of an inch.

It will be understood, that when the contact feeler rod is pushed inwardly, the rack pinion 77 is so rotated as to tend to move the stop arm 81 away from the spring pressed stop 83, these stops remaining in contact only because the hair spring 93 causes the gear wheel 47, which latter carries the stop 83, to rotate in such direction as will cause the stop 83 to follow the stop 81. If the contact feeler rod is pushed violently inward due to shock imparted to it, the stops 81 and 83 will temporarily separate, this preventing the shock from being imparted to the gear wheel 47 and insuring against stripping of the delicate gear teeth thereon or on the center pinion. The spring 85 acts to absorb the shock of the recoil when the stops separate and again come into contact under the action of the hair spring, the shock thus caused being sufficient in many instances to strip or damage the gear teeth if provision is not made to prevent it.

It will be observed that in the present construction both the bezel assembly, and the gear mechanism including the reciprocatory rack, are carried solely by the front plate, and that upon removal of the front plate the gear mechanism can be conveniently inspected and repaired, and further that the gear mechanism can be assembled on the front plate as a separate unit in the manufacture of the gauge. As the contact feeler rod is mounted solely on the casing body formed by the ring member 1, and the gear mechanism is mounted solely on the front plate, slight inaccuracies in the positioning of the front plate relative to the rest of the casing will not affect the meshing of the rack teeth with the rack pinion. Thus is avoided the defect of prior gauges in which the rack is mounted on and guided by the casing body while the rack pinion is operatively mounted on the front plate.

In the modification of the invention shown by Figs. 11 and 13 the bezel assembly is as heretofore described except that the ring 31 is omitted and the dial plate is in the form of a resilient cup-shaped member 117 having a peripheral flange 119 the rim 121 of which rests against the inner edge of the crystal 27 so as to hold it against the bead 25. When the parts are assembled the dial plate is compressed axially thereof so as to serve as a spring which operatively abuts at one end with the front plate and at the other end with the periphery of the crystal. This holds the crystal in place and urges the bezel ring 19 forwardly so as to hold the split ring 23 against the annular shoulder 17 on the front plate.

In the modification of the invention shown by Figs. 12 and 14 the spacing ring 31 is substituted by a ring 123 which need not be resilient axially like the spring 31, the pressure for holding the ring 123 against the crystal 27 and urging the bezel ring 19 outwardly relative to the front plate 9 being secured by a flat spring plate 125 interposed between the front plate and dial plate 29. This spring plate, as indicated in Fig. 14, is preferably of triangular shape and is provided with a central opening 127.

It will be understood that wide deviations may be made from the forms of the invention shown without departing from the spirit of the invention.

I claim:

1. A gauge having, in combination, a movable indicator member; a movable primary actuated part; motion transmitting means between said member and part comprising a stop member positioned in accordance with the position of said primary actuated part; said motion transmitting means also comprising a movable part operatively connected to said indicator member and carrying an abutment, and also operatively carrying a stop member and spring means yieldingly urging said stop member against said abutment; the first mentioned stop member cooperating with the last mentioned stop member, and, when moved by said primary actuated part against said last mentioned stop member, tending to force it away from said abutment against the resistance of said spring means; and a second spring means operatively acting to move said second mentioned movable part in such direction as to press the stop member carried by the latter against the first mentioned stop member under a force less than that exerted by the first mentioned spring means on said second mentioned stop member to hold the latter against said abutment.

2. A device of the character described having, in combination, a movable indicator member, a primary actuated part, motion transmitting means between said member and part comprising a movable stop member positioned in accordance with the position of said part, a gear member, an abutment operatively carried by the latter, means operatively carried thereby presenting a stop member and spring means for yieldingly holding this stop member against said abutment, means including a gear meshing with said gear member operatively connecting it to said indicator member for actuation of the latter, and spring means urging said gear member to move the stop member carried thereby into contact with the other stop member under forces which are less than the force which holds the stop member carried by said gear member against said abutment, said stop members when in contact tending to move the stop member carried by said gear member from against said abutment.

3. A dial micrometer gauge having, in combination, a support, a movable indicator part carried by said support, a reciprocatory contact feeler actuated rack carried by said support, a rack pinion member meshing with said rack, a gear wheel member coaxial with said pinion member; means presenting a stop operatively carried by and rotatable with one of said members, and, rotatable with and operatively carried by the other of said members, a second stop, an abutment, and spring means for normally holding said second stop operatively against said abutment; gear means operatively connecting said gear wheel member to said indicator part, and spring means operating upon said gear means for urging said stops into contact in such direction as tends to move said second stop from against said abutment, said second stop normally being held against said abutment by said first mentioned spring means under a greater force than that exerted by said second mentioned spring means to urge it out of contact with said abutment.

4. A dial micrometer gauge having, in combination, a casing, a removable front plate for said casing which when removed forms an opening therein, an indicator and a train of gearing carried solely by said front plate and being of such dimensions as to be removable through said opening while assembled with said front plate, said gearing including a reciprocatory rack; a reciprocatory contact feeler rod for operating said train carried solely by said casing independently of said front plate, which rod contacts said rack for reciprocation therewith and moves out of contact therewith when said rack is moved laterally by removal of said front plate from said casing, guide means for said rod carried by said casing, and relatively slidable means associated with said guide means and rod for preventing rotation of the latter relative to said rack.

5. A dial micrometer gauge having, in combination, a casing, a removable front plate for said casing which when removed forms an opening in said casing, an indicator and a train of gearing carried solely by said front plate and being of such dimensions as to be removable through said opening while assembled with said front plate, said gearing including a reciprocatory rack; a reciprocatory contact feeler rod for operating said train operatively carried solely by said casing independently of said front plate, said rod and rack being formed for substantially point contact with each other, said casing operatively carrying means independent of said rack and front plate and coacting with said rod for restraining the latter against rotation relative to said rack, and spring means urging said rack operatively into contact with said rod.

6. A device of the character described having, in combination, a movable indicator member, mechanism for operating the latter comprising motion transmitting means including a pair of movable parts each of which operatively carries one stop member of a pair of cooperating movable separable stop members for transmitting motion in one direction, spring means operatively acting on one of said parts for urging said indicator member to move in one direction and for urging said stop members into contact, at least one of said stop members being yieldable relative to that one of said parts which carries it when said stop members are in contact under substantially greater forces than normally exerted by said spring means.

7. A device of the character described having, in combination, a movable indicator member, mechanism for operating the latter comprising motion transmitting means including a pair of movable parts each of which operatively carries one stop member of a pair of cooperating movable separable stop members for transmitting motion in one direction, one of which parts is connected to said indicator member through toothed gearing, spring means operatively acting on said gearing for urging said indicator member to move in one direction and for urging said stop members into contact, at least one of said stop members being yieldable relative to that one of said parts which carries it when said stop members are in contact under substantially greater forces than normally exerted by said spring means.

8. A gauge of the character described having, in combination, a movable indicator member, mechanism for operating the latter comprising motion transmitting means including a pair of movable members one of which is positioned in accordance with the value to be gauged and the other of which is connected to said indicator member through toothed gearing and each of which is operatively provided with a stop member, said stop members each being in the path of movement of the other; spring means operatively acting on that member of said pair of members which is so positioned for urging the stop member provided for that member away from the other stop member; spring means operatively acting on the last mentioned stop member for urging said indicator member to move in one direction and for urging said last mentioned stop member into contact with the other stop member, at least one of said stop members being yieldable relative to that one of said movable members for which it is provided when said stop members are in contact under substantially greater forces than normally exerted by said last mentioned spring means.

9. A gauge of the character described having, in combination, a movable indicator member, mechanism for operating the latter comprising motion transmitting means including a pair of movable members one of which is positioned in accordance with the value to be gauged and the other of which is connected to said indicator member through toothed gearing and each of which is operatively provided with a stop member, said stop members each being in the path of movement of the other, and at least one of them being movable relative to the member for which it is provided, which member is operatively provided with an abutment and spring means for yieldingly holding said stop member against said abutment; spring means operatively acting on that member of said pair of members which is so positioned for urging the stop member provided for that member away from the other stop member; spring means operatively acting on said other stop member for urging said indicator member to move in one direction and for urging that stop member into contact with the other stop member, said spring means for holding said stop member against said abutment being of sufficient strength normally to so hold said stop member but yielding when said stop members are in contact under substantially greater forces than normally exerted by said spring means which urges one stop member into contact with the other stop member.

10. A gauge of the character described having, in combination, a casing operatively carrying a movable work contact and a movable indicator member, motion transmitting means connecting said contact to said member including a pair of movable parts each of which operatively carries one stop member of a pair of cooperating movable separable stop members for transmitting motion in one direction so relatively positioned that one stop member tends to move away from the other stop member when said work contact is moved toward said casing, said motion transmitting means comprising toothed gearing operatively connecting that one of said parts which carries said other stop member to said indicator member, spring means operatively acting on said gearing for urging the last mentioned stop member to move into contact with the other stop member, at least one of said stop members being yieldable relatively to that one of said parts which carries it when they are in contact under substantially greater forces than are exerted thereon by said spring means.

WARREN AMES.